Patented Aug. 8, 1950

2,517,890

UNITED STATES PATENT OFFICE 2,517,890

INSOLUBLE COPPER COMPLEXES OF MONAZO COMPOUNDS

Donovan E. Kvalnes, Penns Grove, and Cheves Walling, Montclair, N. J., assignors to E. I. du Pont de Nemours & Company, Wilmington, Del., a corporation of Delaware No Drawing. Application March 23, 1948, Serial No. 16,627

1 Claim. (Cl. 260—149)

This invention relates to metallized insoluble monazo compounds which are especially adapted for dyeing nylon in dark shades from aqueous dispersions, such as nylon fibers, and especially to such insoluble compounds which are the products of coupling the diazo of a 5-nitro-2-aminophenol which is devoid of water-solubilizing groups with azo dye coupling components having an acyclic group containing a methylene group and metallizing them with copper.

In so far as applicants are aware, it has heretofore been necessary to use acid colors, developed colors or dyes of the anthraquinone type in order to dye nylon fibers in dark shades such as blues, greys and blacks. Acid colors require the use of acidic baths and they are disadvantageous in the dyeing of union goods. Developed colors require a series of time consuming operations to obtain the desired shades. Dyeings with anthraquinone dyes do not discharge satisfactorily. It is therefore desired to provide dyes in dark shades having satisfactory general properties and which do not have the disadvantageous properties noted.

Certain metallized compounds of the azo series involving 4-nitro-2-amino-phenols coupled to acetoacetic ester and acetoacetanilide are known. However, they are yellows or brownish-yellows and the chromium compounds are water soluble. For example, the metallized monazo, 4-nitro-2-amino-phenol→acetoacetic ester, chromed in substance is a yellow brown powder, soluble in water to a yellow solution, dyeing wool from a bath, acidified with sulfuric acid in fast reddish yellow shades. The monazo combination 2-amino-4-methyl - 6 - nitro-phenol→acetoacetanilide, chromed in substance, or a similar combination using 2-amino-4,6-dinitro-phenol are water-soluble and give yellow and brownish-yellow dyeings respectively on wool from their aqueous solutions. Certain metallized water-insoluble azo compounds of somewhat similar azo structure but unlike the compounds of the present invention are also reported to have been made which are metallized with cobalt. These compounds have been dissolved in cellulose nitrate lacquers producing yellow solutions. Such a yellow insoluble compound is the monazo compound 4-nitro-2-amino-phenol→acetoacetanilide which is cobalted by a certain treatment of the monazo compound with a cobalt salt.

It is among the objects of the present invention to provide deep shade, insoluble dispersible dyestuffs having good affinity for nylon fibers and other good general properties. Other objects of the invention will be apparent from the following description.

The objects of the invention are achieved in general by providing insoluble copper complexes of monazo dyes which are products derived by simultaneously metallizing and coupling in a special medium the diazo of a 5-nitro-2-aminophenol which is devoid of solubilizing groups, but which may be substituted by other groups, with an azo dye coupling component having an acyclic group containing a methylene group. These metallized insoluble colored compounds have the unusual property of especially good affinity for nylon from aqueous dispersions, and they yield attractive dark shades having good light and washing fastness. Of especial value and novelty are the dyes of the present invention which produce the darkest shades, such as blacks, since it is now possible with these dyes to dye nylon in these shades with the use of a single dye. The dyes used for blacks heretofore were mainly developed colors which are relatively costly to make and process.

The invention will be more fully set forth in the following more detailed description which includes examples that are given as illustrative embodiments of the invention and not as limitations thereof. Parts are expressed in parts by weight unless otherwise noted.

EXAMPLE 1

To 15.4 parts of 5-nitro-2-amino-phenol dissolved in 100 parts of water containing 4.0 parts sodium hydroxide, 13.0 parts of hydrochloric acid are added as a 10% solution, and then enough ice is added to reduce the temperature of the mixture to 10° C. 6.9 parts sodium nitrite are added as a 10% solution and after one-half hour, the resulting diazonium compound is poured into a solution of 13 parts of the ethyl ester of acetoacetic acid, 30 parts of copper sulfate and 7 parts of ammonia in 200 parts of water at 5° C. This mixture is alkaline. Coupling and metallization are concurrent. After 30 minutes the resulting copper complex of the azo compound is removed by filtration and dried. From a dispersed dyebath in which soap is used as the dispersing agent, the product dyes nylon a grey shade which builds up to a good black and shows good fastness to light and washing.

EXAMPLE 2

A suspension compsed of 100 parts of water and 15.4 parts of the diazo of 5-nitro-2-amino-phenol is made. A solution of 19 parts of ethyl benzoylacetate, 30 parts of copper sulfate and 6.5 parts of ammonia in 250 parts of water is added to the suspension. After 15 minutes the resulting slurry is heated to 60° C. for ½ hour. The precipitate which is composed of the copper complex of the azo compound is removed by filtration. When applied from an aqueous dispersion in which soap is used as the dispersing agent, the product dyes nylon a pleasing shade of blue which has good fastness properties.

Other illustrations of the invention are indicated in Table I by the combinations noted which were combined by procedures similar to those described in the foregoing examples, i. e. concurrent coupling and metallization in the presence of ammonia. The shades of the dyeings on nylon textile fibers, which were made from aqueous dispersions in a manner similar to the dyeings hereinbefore described, are indicated in the right-hand column. All of these dyestuffs are copper complexes and all are water-insoluble.

the whole heated gradually to 190° F., where it is maintained for 15 minutes. During this time, the nylon material is turned frequently to insure even dyeing. At the end of the dyeing period, the fabric is removed, rinsed and dried. It will be found to be an even black. By using 2 instead of 4 parts of the copper complex, a lighter or grey shade is produced.

The compounds of the present invention may be used for other purposes besides the dyeing of nylon. For example, they may be used for the beater-dyeing of paper from aqueous dispersions. The compounds are also useful as spirit-soluble colors and as pigments for coloring nitro-cellulose lacquers.

This is a continuation-in-part of our abandoned co-pending application Serial No. 461,478.

From the foregoing disclosure it will be recognized that the invention is susceptible of modification without departing from the spirit and scope thereof and it is to be understood that the

*Table 1*

| Example | Diazo Component | Coupling Component | Color |
|---|---|---|---|
| 3 | 5-nitro-2-amino-phenol | acetoacetanilide | black. |
| 4 | do | N-beta-hydroxyethyl acetoacetamide | blue. |
| 5 | do | acetoacetyl sulfanilamide | black. |
| 6 | do | methyl acetoacetate | Do. |
| 7 | do | acetone dicarboxylate diethyl ester | blue-black. |
| 8 | 4-chlor-5-nitro-2-amino-phenol | acetoacetanilide | Do. |
| 9 | do | N-beta hydroxyethyl acetoacetamide | Do. |
| 10 | do | ethyl benzoylacetate | blue. |

Combinations giving dyeings having the described desirable properties on textile nylon in various shades ranging from blues to greys and blacks are produced by coupling and treating as hereinbefore described the diazo of 5-nitro-2-amino-phenol which may be additionally substituted by a chlorine atom in the 4-position. As the coupling component in any of the indicated combinations, compounds having an acyclic group containing an active methylene group are used. Illustrations of such coupling components are the methyl, ethyl, propyl and butyl esters of acetoacetic, propionyl-acetic, butyral-acetic, and other acyl-acetic acids.

Any of the known dyeing procedures which are suitable for applying water insoluble dyes from aqueous dispersions can be used to dye textile nylon fibers with the dyes of the present invention. For example, 4 parts of the copper complex of 5-nitro-2-amino-phenol→acetoacetic ester prepared as in Example 1 is ground to a smooth paste with 100 parts of 10% soap solution and added to 3,000 parts of water. 100 parts of textile material fabricated from nylon is added, and invention is not restricted to the specific illustrations thereof herein set forth.

We claim:

The water insoluble copper complex of the monazo coupling product produced by coupling in a medium alkaline with ammonia the diazo of 5-nitro-2-amino-phenol with the ethyl ester of acetoacetic acid; and concurrently metallizing with copper.

DONOVAN E. KVALNES.
CHEVES WALLING.

REFERENCES CITED

The following references are of record in the file of this patent:

UNITED STATES PATENTS

| Number | Name | Date |
|---|---|---|
| 1,656,844 | Straub et al. | Jan. 17, 1928 |
| 1,877,615 | Straub et al. | Sept. 13, 1932 |
| 1,887,602 | Straub | Nov. 15, 1932 |
| 1,990,257 | Straub et al. | Feb. 5, 1935 |
| 1,994,116 | Straub | Mar. 12, 1935 |
| 2,104,357 | Straub et al. | Dec. 4, 1938 |
| 2,305,095 | Mackenzie | Dec. 15, 1942 |